United States Patent [19]
Wang et al.

[11] Patent Number: 5,740,279
[45] Date of Patent: Apr. 14, 1998

[54] CLUSTER DOT HALFTONING SYSTEM

[75] Inventors: Shen-ge Wang, Fairport; Tse-kee Chan, Penfield; Fritz F. Ebner, Rochester, all of N.Y.

[73] Assignee: Xerox Corporation, Stamford, Conn.

[21] Appl. No.: 753,576

[22] Filed: Nov. 26, 1996

[51] Int. Cl.⁶ .................................................. H04N 1/405
[52] U.S. Cl. .................. 382/237; 382/270; 358/456; 358/457; 358/460
[58] Field of Search .......................... 382/237, 270; 358/456, 457, 458, 460, 466, 534, 535, 536, 298; 395/109

[56] References Cited

U.S. PATENT DOCUMENTS

| | | |
|---|---|---|
| 4,149,194 | 4/1979 | Holladay . |
| 4,485,397 | 11/1984 | Schueter et al. . |
| 4,876,611 | 10/1989 | Fischer et al. ............... 358/456 |
| 5,014,123 | 5/1991 | Imoto . |
| 5,181,162 | 1/1993 | Smith et al. ............... 364/419 |
| 5,341,228 | 8/1994 | Parker et al. ............... 358/534 |
| 5,394,252 | 2/1995 | Holladay et al. ............ 358/533 |
| 5,673,121 | 9/1997 | Wang ....................... 358/456 |

FOREIGN PATENT DOCUMENTS

| | | |
|---|---|---|
| 0665677 | 1/1994 | European Pat. Off. . |
| 0665676 | 12/1994 | European Pat. Off. . |
| 0665675 | 12/1995 | European Pat. Off. . |

OTHER PUBLICATIONS

Binarization Using a Two–Dimensional Pulse–Density Modulation by R Eschbach and R. Hauck, Journal of the Optical Society of America A 4, 1873–1878 (1987).

"Pulse–Density Modulation on Rastered Media; Combining Pulse–Density Modulation and Error Diffusion", by R. Eschbach, Journal of the Optical Society of America A, 7, 708–716 (1990).

*Primary Examiner*—Scott Rogers

[57] ABSTRACT

A method of constructing a screen for halftoning a digitized image is described, in which a composite screen is established. A composite LUT having m times n rank ordered threshold elements is constructed for use in halftoning digitized images. A variety of optimization techniques can be employed to improve the visual appeal of the images rendered using the composite LUT for rendering a variety of image types in single or multicolored imaging applications.

10 Claims, 5 Drawing Sheets

CLUSTER DOT HALFTONING SYSTEM

The present invention relates to a digitized rendering system as may be used in color printing systems (such as in electrophotographic and ink-jet printers and copiers), and more particularly, to an apparatus and method for selectively implementing LUT stored cluster dot halftoning systems so as to improve black and white and/or color output image quality.

In the operation of a copier or printer, particularly color machines, it is highly desirable to have means for variably processing and enhancing graphical, as well as in some cases, text and pictorial image quality (hereinafter referred to as "image quality" or the like unless otherwise noted). Particularly in the case of single or multi-pass color printers, it is highly desirable that an image processing system be employed to reduce imaging problems caused by rendering systems not suited to a variety of image types or the particular gray levels in those image types. While the preprogrammable imaging system of the present invention is quite suitable for use on xerographic printers in which aspects of it have been tested, it may be likewise highly useful with a variety of other xerographic as well as non-xerographic printing systems such as ink-jet or other printing techniques.

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. Non-xerographic systems (such as ink-jet) may be more or less successful in printing high quality images of varying types in and may involve capabilities and/or efficiencies unlike those found in xerographic systems.

Various image rendering systems have been employed to include those set forth in the following disclosures which may be relevant to various aspects of the present invention:

U.S. Pat. No. 5,394,252

Patentee: Holladay et al.

Issued: Feb. 28, 1995

U.S. Pat. No. 5,341,228

Patentee: Parker et al.

Issued: Aug. 23, 1994

U.S. Pat. No. 5,181,162

Patentee: Smith et al.

Issued: Jan. 19, 1993

U.S. Pat. No. 5,014,123

Patentee: Imoto

Issued: May 7, 1991

U.S. Pat. No. 4,485,397

Patentee: Schueter et al.

Issued: Nov. 27, 1984

U.S. Pat. No. 4,876,611

Patentee: Fischer et al.

Issued: Oct. 24, 1989

U.S. Pat. No. 4,149,194

Patentee: Holladay

Issued: Apr. 10, 1979

EPO App: 0665675

Applicant: Naik et al.

Priority Date: Dec. 26, 1995

EPO App.: 0665676

Applicant: Winter et al.

Priority Date: Dec. 27, 1994

EPO App.: 0665677

Applicant: Winter et al.

Priority Date: Jan. 27, 1994

"Binarization Using a Two-Dimensional Pulse-Density

Modulation", by R. Eschbach and R. Hauck,

Journal of the Optical Society of America A, 4, 1873–1878 (1987)

"Pulse-Density Modulation on Rastered Media: Combining Pulse-Density

Modulation and Error Diffusion", by R. Eschbach,

Journal of the Optical Society of America A, 7, 708–716 (1990)

U.S. Pat. No. 5,394,252 to Holladay et al. (and others) teach of the advantages of stochastic or non-periodic screening over periodic screening in the suppression of moiré effects.

U.S. Pat. No. 5,341,228 to Parker et al. discloses a halftoning system using a stochastic process known as a blue noise mask. Briefly, the procedure can be described as follows: 1) Starting at one gray level with a chosen dot pattern, or "seed", the process iteratively uses a Fast Fourier Transform (FFT) techniques with a "blue noise" filter to redistribute all spots in dot pattern and eliminate large visual "clumps"; 2) Next, the dot pattern is processed at the next gray level by increasing (or decreasing) certain number of black spots on the previously determined dot pattern. Existing black (or white) spots are not moved. The same filtering technique is used to distribute newly added (or subtracted) dots; 3) Step 2 is then repeated for all gray levels sequentially. At each step, the width of the blue-noise filter varies by an amount corresponding to the current gray level; 4). The summation of dot patterns for each gray levels is the blue noise mask generated. The mask is then used to generate a halftone screen. The result of described sequential design procedure strongly depends on the choice of the seed pattern. If the output is not a satisfactory one, the design procedure has to start over again by choosing different seed or changing the blue noise filter. Since the threshold value of each pixel of the dithering screen is fixed at the gray level when the corresponding dot is added (or eliminated), the freedom to locate undetermined pixels is getting smaller and smaller while the design sequence is approaching the end. These constraints limit further improvement of the image quality generated by blue noise masks.

U.S. Pat. No. 5,181,162 discloses an object-oriented document management and production system in which documents are represented as collections of logical components, or "objects", that may be combined and physically mapped onto a page-by-page layout. Stored objects are organized, accessed and manipulated through a database management system. At a minimum, objects contain basic information-bearing constituents such as text, image, voice or graphics. Objects may also contain further data specifying appearance characteristics, relationships to other objects and access restrictions.

U.S. Pat. No. 4,485,397 to Scheuter et al. describes a method for generating a non-periodic halftone distribution by determining areas of constant or nearly constant input density and by distributing a precalculated number of print dots inside each area based on a random or pseudo random number and some spatial constraints.

U.S. Pat. No. 4,876,611 to Fischer et al. describes another stochastic screening algorithm in which the print/no-print decision is based on a recursive subdivision of the print field maintaining average density over the larger print field.

U.S. Pat. No. 4,149,194 to Holladay discloses an electronic signal representing the density of a scanned image electronically halftoned by combining the pictorial signal with a rectangular array of halftone screen values to form an electronic halftone image. The halftone screen values is rotated at variable angles to the original electronic image by defining a repetitive rectangular matrix representative of any predetermined halftone cell approximating a parallelogram and incorporating a shifting parameter for the repetitive rectangular matrix.

EPO Application No. 0665675 discloses a color printer system including an interactive user interface that allows a choice between one "button" automatic control of color output or multibutton control of color output, with both automatic and manual options providing independent control for color halftoning and for color correction based on the types of objects to be printed. The preferred form allows independent print-rendering options for text, graphics and photo image.

EPO Application No. 0665676 discloses a method of using a printer system for identifying one or more different types of color objects in a document, selecting a preferred rendering option such as halftoning and/or color matching for each one of such different color object type, and then printing the document in accordance with the rendering options selected for each of such different color object types. Blocks 54 are provided for the identification of the object type of document objects. A print driver flags the object with their types at block 54. In a printing system such as an ink-jet color printer coupled through a printer driver to a host computer, a default halftoning technique and a default color-matching map are incorporated into the printer system for automatic invocation whenever a particular color object type (41043) is printed.

EPO Application No. 0665677 discloses the use of different print-quality modes in a printer, such as a color ink-jet printer, invoke different color-rendering options for a particular object to be printed—in a composite document having objects of different types. In an exemplary embodiment, a printer control automatically invokes an error-diffusion halftoning technique for photograph-like images whenever a high-quality print mode is designated, and automatically invokes a dither halftoning technique for photograph-like images whenever a normal or fast print mode is designated.

A non-periodic halftoning scheme based on a pulse-density modulation is taught in "Binarization using a two-dimensional pulse-density modulation", by R. Eschbach and R. Hauck, Journal of the Optical Society of America A, 4, 1873–1878 (1987); and "Pulse-density modulation on rastered media: combining pulse-density modulation and error diffusion", by R. Eschbach, Journal of the Optical Society of America A, 7, 708–716 (1990). In pulse-density modulation a mathematical model is used that guarantees the local density of print pulses as a function of the input image data.

In accordance with one aspect of the present invention, there is provided a system including a merged or composite screen. This composite or merged screen may be created according to a method of constructing a composite screen for halftoning a digitized image, including the steps of: selecting a cluster screen halftoning system having a cell size of m cluster pixels; selecting a stochastic screen halftoning system size having a set of n stochastic pixels; and merging the set of n pixels and m pixels into a composite stochastic screen of halftone cluster LUT having the set of threshold elements.

In a more specific embodiment of the above aspect, a method of rank ordering the for turn on these elements in at least a first half of the LUT is determined according to the steps of:

a) selecting a random pair of elements from all threshold elements within the first half of the LUT;

b) swapping the threshold of the two selected random elements;

c) calculating a centroid penalty and a momentum penalty associated with the swapped thresholds;

d) calculating a centroid penalty and a momentum penalty associated with the thresholds before the thresholds were swapped;

e) retaining the swapped thresholds in the first half of the LUT only when a first sum of the step d calculated penalties is less than a second sum of the step e calculated penalties; and f) repeating steps a through e for a predetermined set of i iterations.

Other features of the present invention will become apparent as the following description proceeds and upon reference to the drawings, in which.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 5:
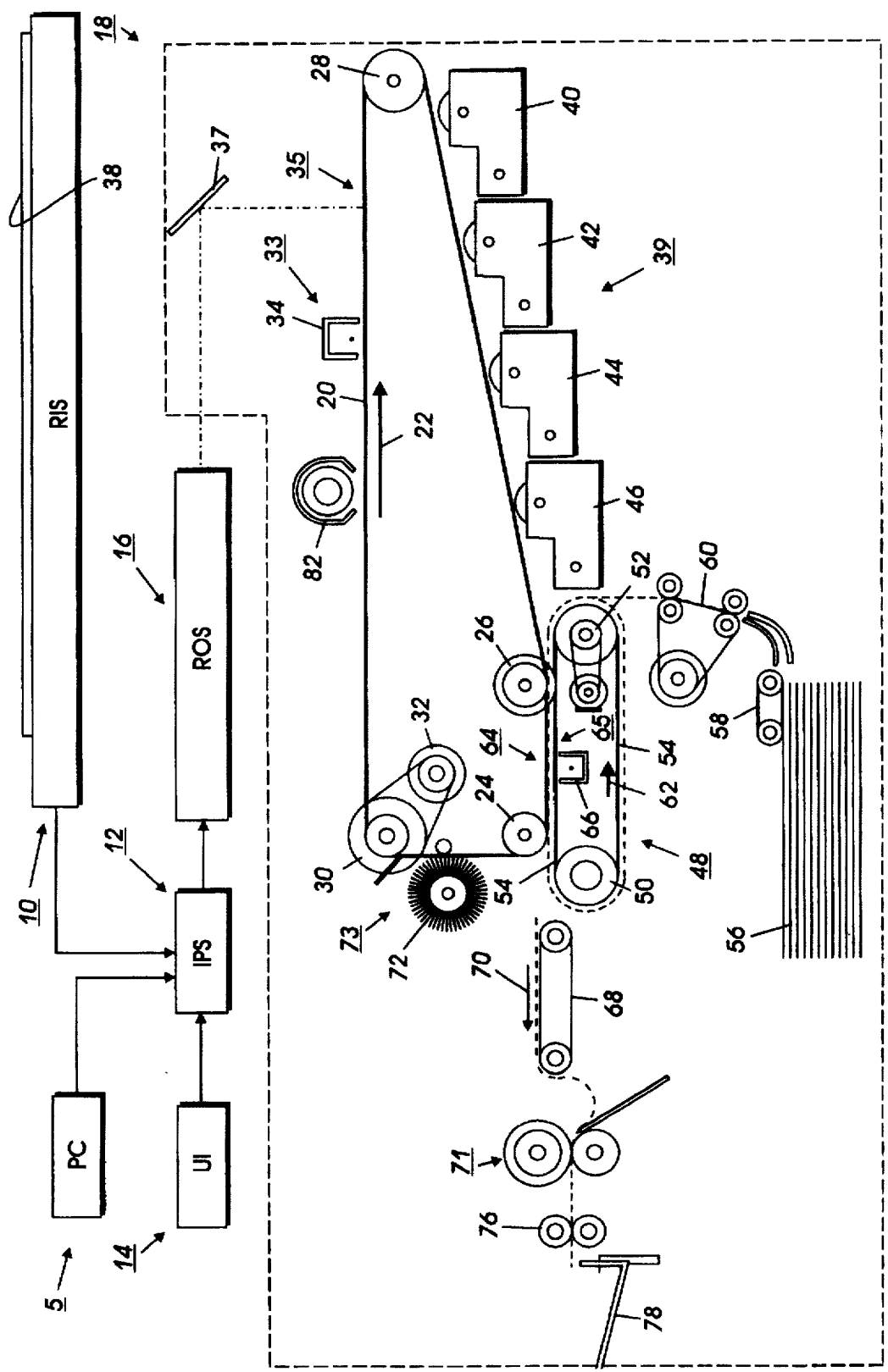
FIG. 5 is a schematic elevational view showing an exemplary color xerographic printing/copying machine and networked PC incorporating features of the present invention therein.

For a general understanding of the features of the present invention, reference is made to the drawings. FIG. 5 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 5), as well as carry out the image rendering selections in accordance with the present invention as described in association with FIGS. 1 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the adaptive image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300 ×1200 dpi, both configurations of which are employed in versions of the Xerox 4900 printer family.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station m the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the imaging systems of the present invention.

In conjunction with FIGS. 1 through 4, the present invention will be generally be described in terms of its application to a printer or copier such as described above in association with FIG. 5.

In some imaging applications, a single size cluster halftone screen simply does not provide enough simulated gray levels. In other applications, multiple sized dot cluster systems may result in more pleasing/higher quality rendered images. Merging several identical single-cluster screens into a large halftone screen and adjusting the threshold values can improve the quality of halftoned images. The present invention includes a merging method which an optimization technique for automatic design of small to very large cluster halftone screens. All pixels in a halftone screen can be divided into several optimization zones based on pixel positions in each cluster. Optimization may be conducted in each zone independently, or zones can be combined to permit optimization based on more than a single zone. In one example of the present invention, 360 single-cluster screens have been merged into a 120×120 element halftone screen. Halftoned images of excellent rendered output quality have been generated by this and other optimized screens of the present invention.

One of the most challenging print quality issues for desktop color laser printers it to print smooth color sweeps in business graphics documents. Even at 600×600 dpi resolution (of single dots, not clusters of dots), these sweeps are often printed with objectionable "steps" that are particularly noticeable in areas where contours of the transitions can been seen. Some desktop color laser printers use stochastic or randomized dot screens to alleviate this problem, as stochastic screens are high frequency in nature and may have cell sizes large enough to support more than 256 digital levels. However, low cost desktop color laser engines are often not stable enough (in terms of xerographic or liquid ink dot placement processes) to reliably support the high frequency characteristics of a stochastic screen, particularly those at higher resolutions such as 600×600 dpi or higher. Such rendering stability problems may manifest themselves in the form of output prints showing excessive banding and "ghosting" or in other ways. However, when stochastic systems are not used, while stability their potential problems may be avoided, the use of more traditional cluster halftone screening approaches may not provide sufficient gray-levels to due with color sweeps at acceptable screen frequency.

The present invention provides a method to design a family of halftone screens that combines the advantages of both cluster halftone and stochastic halftone. The halftone screen generated by according to the system of the present invention supports sufficient gray-levels for sweeps at acceptable screen frequency, while at the same time maintains rendering stability. A variety of halftone screens may be used in conjunction with the present invention, to include the "Hybrid Imaging System" disclosed in application Ser. No. 08/625,324 assigned to Xerox, incorporated herein by reference. The dot associated with the aforementioned implementation appears stochastic in the highlight region but desirably grows into a cluster-type screen with regular growth pattern (such as a four-dot cluster or matrix) in the mid-tone and shadow regions. The screens of the present invention may be used with selected image types, or with certain (or all) color separations. (Output rendering tests have shown that high quality multicolored images may be generated using the system of the present invention to halftone the yellow color separation in a four color system such as described above in conjunction with FIG. 5.)

One implementation of the present invention is in the generation of stochastic screen of halftone clusters. In this application, pixels are turned-on in clusters but the clusters themselves are "selected" based on a stochastic or randomized screening system. In traditional stochastic screen design, it is the turn-on order of each pixel that is stochastic instead of a cluster of pixels. In particular, the screen of the present invention is useful to eliminate moiré patterns as well as to provide for a more stable imaging platform (that is, a process that will be less prone to resulting in undesirable image outputs such as may occur in xerographic or other types of print engines).

Figure 1:
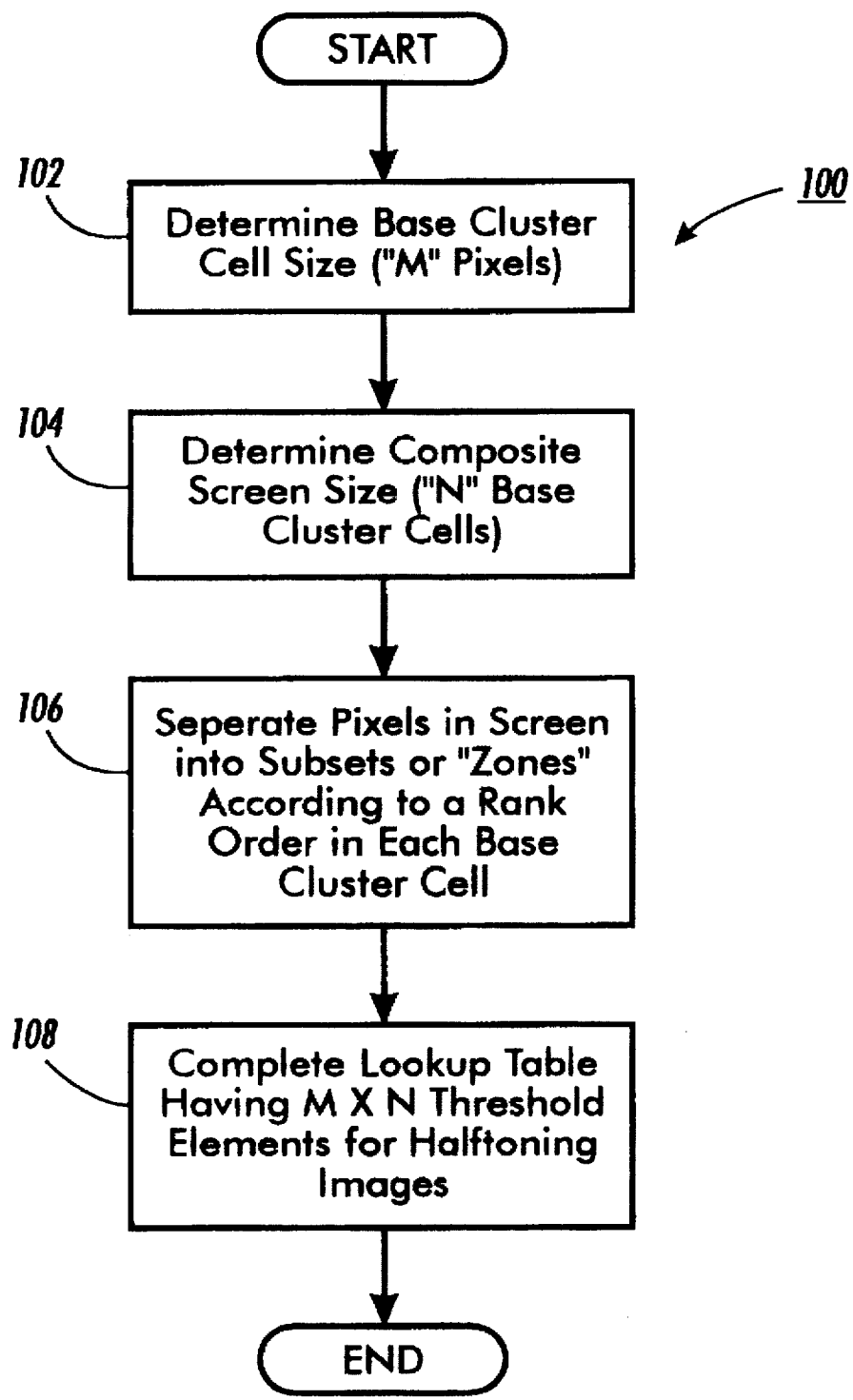
FIG. 1 is a flow chart of a generalized embodiment of the system of the present invention.

The FIG. 1 flow chart provides a general description of how a composite screen system 100 may be assembled according to one embodiment of the present invention (as will later be described in additional detail.) According to block 102, a base cluster cell size is selected, that is the number of pixels m (greater than 4) that will provided in a base cell. Block 104 shows the selection of the number of base clusters n that will be used to form the composite screen. Block 106 shows the separation of pixels into subsets or zones according to a rank order in the base cluster cell (or in other embodiments, according to a rank order of all m×n elements); rank order may be determined by structured/ ordering system, by a randomizing system or by an optimizing system (examples of each system are described below). Block 108 shows the completion/assembly of the lookup table having m×n threshold elements for halftoning images. Again, the details associated with the various embodiments associated with the FIG. 1 system of the present invention are described below.

As will be noted in examples to follow, a small-sized cluster screen (made with a relatively low number "m" pixels in a base cell or using a low number "n" of all base cluster cells used) may not generate enough simulated gray levels for halftoning in a particular application. When the number of gray levels generated is insufficient, merging several (or more) small cluster screens into a larger halftone cluster screen can increase the total number of levels. Many different dual dots and quad dots have been designed for this purpose. If a single-cluster halftone screen has a total of N pixels, it can only generate N+1 different halftone patterns from images with constant input levels. For example, a six-by-three 45° rotation sized cluster screen is specified by 18 threshold values shown in Table 1 below. The halftone output by this screen with proper normalization and a continuous-tone ramp input ranged from 128 to 255 is shown in sweep 10 of FIG. 2. As may be noted, there are only 10 different halftone patterns or "steps" in sweep 110 of FIG. 2, including the far right (white) pattern. While such a system may be adequate for some imaging situations (text, pictures/bitmaps and less demanding graphics), it can easily result in the non-uniform steps or contours shown in sweep 10 of FIG. 1.

TABLE 1

| 10 | 12 | 11 | 6 | 3 | 4 |
|----|----|----|---|---|---|
| 17 | 18 | 14 | 5 | 1 | 2 |
| 15 | 26 | 13 | 8 | 7 | 9 |

Figure 2:
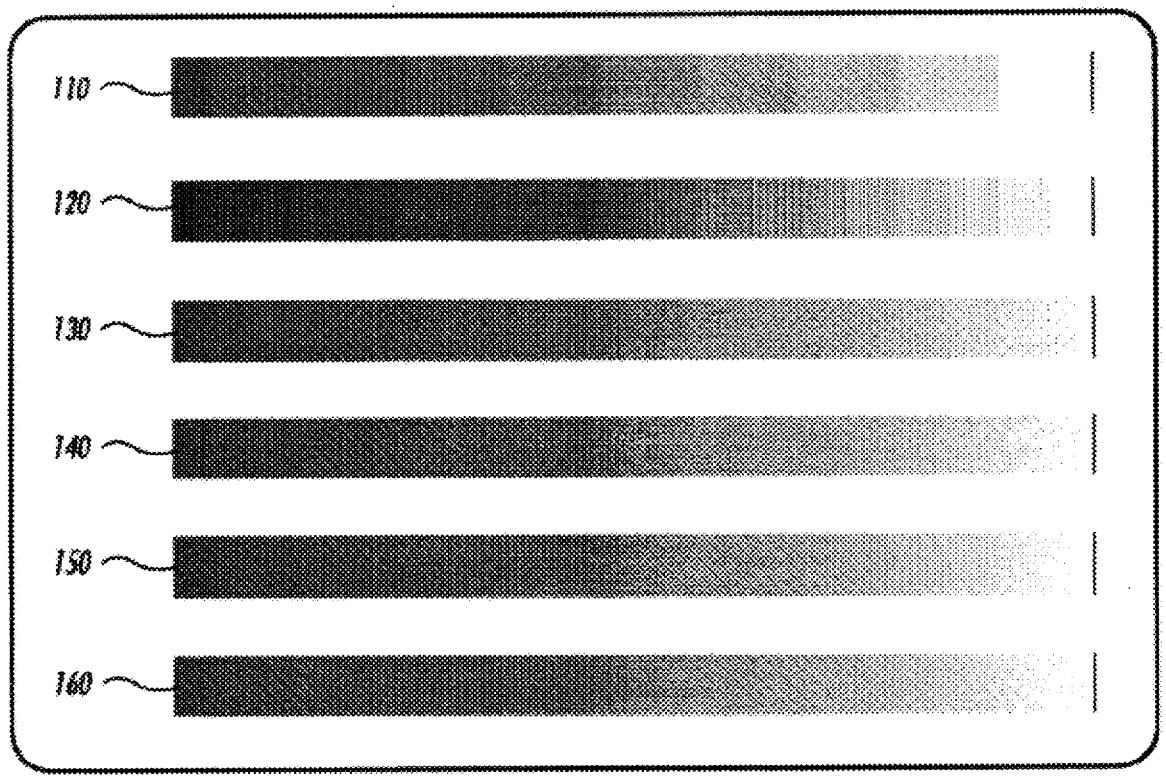
FIG. 2 is a set of exemplary rendered sweeps generated according to embodiments of the present invention.

Table 1 shows the rank orders of the 18 elements of a six-by-three 45° rotation halftone screen used to generate sweep 110 of FIG. 2.

A screen double that of the sweep 110/Table 1 size is shown in sweep 120 of FIG. 2. The 12×3 cluster and the new rank orders of the system are shown in Table 2 below. As may be noted, the rank orders of the first 6×3 elements are given by two times the rank orders in Table 1, respectively, minus one, and the second 6×3, two times the orders in Table 1. A halftone image by the 12×3 screen with proper normalization is generated and shown in sweep 120 of FIG. 2. As may be observed, the number of discretely identifiable "steps" in sweep 20 (including white at the far right) has been increased to 19.

TABLE 2

| 19 | 23 | 21 | 11 | 5  | 7  | 20 | 24 | 22 | 12 | 6  | 8  |
|----|----|----|----|----|----|----|----|----|----|----|----|
| 33 | 35 | 27 | 9  | 1  | 3  | 34 | 36 | 28 | 10 | 2  | 4  |
| 29 | 31 | 25 | 15 | 13 | 17 | 30 | 32 | 26 | 16 | 14 | 18 |

Table 2 shows the rank orders of a 12-by-3 dual dot and 45° rotation screen used to generate sweep 120 of FIG. 2.

In a similar manner, even larger clustered halftone screen containing multiple identical clusters can be produced from an original (small) single-cluster halftone screen, termed hereafter as the "base cluster cell". There are n base cluster cells in each larger ("composite") screen and there are m pixels in each cell. Each pixel in the composite screen may be thus divided into m subsets, or zones, according to the corresponding rank orders in the base cluster cell. For example, consider a 60×60 halftone screen built with 200 cluster cells created according to Table 1 above. All pixels located at the position corresponding to the rank order k in Table 1 belong to the k-th zone, and numbers, from (k−1) ×200+1 to k×200, will be assigned to members of this zone.

The assignment of the m different numbers to m members of each zone are compiled according to various iterative processes. A first example assigns the numbers for all zones simply in a fixed sequence, column by column and row by row. Sweep 130 of FIG. 2 shows the output of a 60×60 screen designed in this first trial. A second example assigns the m numbers to m positions randomly and the output is shown in sweep 140 of FIG. 1. While improved uniformity and reduced stepping/contouring may be seen to result from these trial examples (compare sweep 110 to 120 and 130 to 140), it was determined that further modifications to the system may lead to even more improved results.

In U.S. patent application Ser. No. 08/749,306 entitled, "Clustered Halftone Dot Design Process," assigned to Xerox, incorporated herein by reference, describes a set of optimization processes for designing cluster screens, the centroid and momentum penalty aspects of which are particularly applicable to the optimization systems described herein. The advantages of the aforementioned cluster dot screen design techniques include that the design process can be started with an existing halftone screen, such as a "manually" designed screen or based the result of a previous iteration (as described in the base cluster cell design iteration previously outlined above). The use of an optimization process has been shown to increase the overall visual appearance of digitally halftoned images generated according to embodiments of the present invention. Therefore, this technique can be used to "smooth" out the steps or transitions created in the trials and examples set forth above, to include the outcome of those examples as illustrated in sweeps 110, 120, 130 and 140 of FIG. 2.

To briefly review an optimization procedure described in the aforementioned application, the assignment of upper-half threshold values (typically gray levels 128 to 255 on a 256 gray scale system), which will distribute the visual black clusters, is essentially the same as the assignment of lower-half threshold values (below 128), which distribute the visual white clusters. As such, only the upper-half design process is described below.

Figure 4:
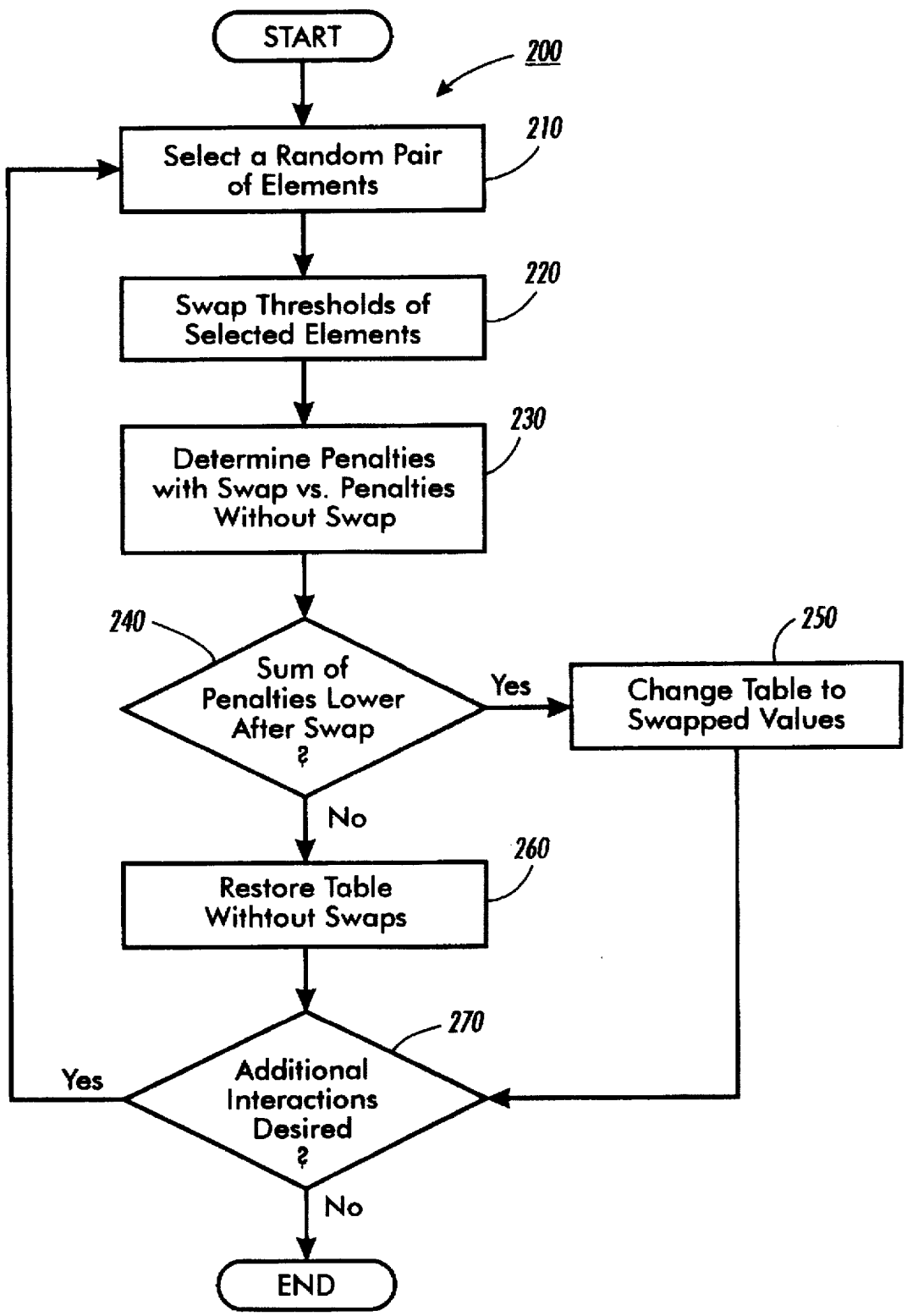
FIG. 4 is an exemplary flow chart of an optimization system employed in embodiments of the present invention.

The following iterative method (generally shown as system 200 in FIG. 4) has been applied to the construction of an improved lookup table (or "LUT") for thresholding digital images, may be described in general terms as follows:

1. Randomly choose a pair of pixels from all elements with upper-half design;
2. Swap the thresholds of two chosen pixels and calculate the centroid and momentum with swapped values;
3. Determine the difference of the penalty functions by the swapping;
4. If swapping results the lower penalty, retain the change. Otherwise, restore the previous values.
5. Repeat the iteration from step 1 to 4 until the desired convergence is reached FIG. 4 shows system 200 detailing the above-described optimization system. Block 210 shows the random selection of a pair of elements for swapping evaluation. According to block 220, the thresholds for the selected elements are swapped. Block 230 shows the determination of the relative swapping penalties before and after the threshold swap. According to block 240, if the sum of the penalties after the swap is lower than before the swap, the table is changed to the swapped thresholds (block 250). If the sum of the penalties after the swap is not lower than before the swap, the table is restored to the original (unswapped) thresholds (block 260). Until no additional iterations are desired (block 270), the system continues to cycle through the steps of blocks 210 through 270. Again, when only one half (such as the upper half of the gray levels) of the table is constructed according to the optimizations described above and below, the second half of the table can be established by merely using the inverse function of the first half.

In a other embodiments of the present invention, rather than selecting a pair of pixels to swap from the entire upper half, the swapping choice to be made can be limited to a subset of threshold values. In order to merge cluster screens, the subsets or "zones" are divided out based on the k rank orders in the base cluster cell. If one zone is selected as the choice for swapping, the optimization will redistribute all threshold values corresponding to pixels located at the same position relative to the coordinate of the base cluster cell. Pixels in the k-th zone possess threshold values from (k−1)×n+1 to k×n, where again, n is the total number of base clusters in the large screen. The swapping will affect neither halftone images with input levels above k×n nor images below (k−1)×n+1. Thus, the optimization is completely independent from design of other zones. In this manner, it is possible to "smooth" the halftone screen zone by zone. Further, the optimization of a single zone only involves evaluation of penalty functions for n levels, instead of the entire upper half of the threshold. As such, the process can result in more rapid convergence toward the desired optimization result.

In yet another embodiment of the system of the present invention, the design of large screens can be accomplished by combining only a few zones together for optimization. In this manner, additional freedom can be traded for additional iterations according to the desired level as may be useful to redistribute threshold values to acceptable or improved levels. The previously discussed 60×60 screen with randomly assigned values (Table 1) was used as the "seed" for the optimization process described above. Eighteen zones were optimized independently in a limited running time (about one hour in total). The output of the refined halftone screen is shown in Sweep 150 of FIG. 2. (The longer the optimization process is continued, the smoother the transition across the resultant sweep.)

In a further example, the Table 1 "seed" is again used for optimization of the combined zones. Eighteen zones defined by the rank orders in Table 1 are grouped into 8 new zones, as shown in Table 3. Optimizations were conducted independently for the 8 zones and each one was interrupted after about ten minutes running. The output of this example is shown in sweep 160 of FIG. 2.

TABLE 3

| 5 | 5 | 5 | 3 | 2 | 2 |
|---|---|---|---|---|---|
| 8 | 8 | 6 | 3 | 1 | 1 |
| 7 | 7 | 6 | 4 | 4 | 4 |

As described above, Table 3 indexes the grouped zones optimized independently for a 60×60 halftone screen.

A further example of improved sweep generation was obtained by merging 360 base cluster cells with 76° rotation. The base cell is specified by the rank orders of 40 elements given in Table 4 below, resulting in a merged 120×120 composite screen. Only 4 zones, with rank orders from 37 to 40 are grouped and optimized by this particular design process. (The optimization process lasted more than 8 hours using a pentium-based SparcStation 10.)

TABLE 4

| 5  | 20 | 24 | 14 | 8  | 7  |   |   |
|----|----|----|----|----|----|---|---|
| 6  | 28 | 34 | 33 | 27 | 17 |   |   |
| 13 | 36 | 40 | 39 | 32 | 23 |   |   |
| 21 | 35 | 38 | 37 | 31 | 15 |   |   |
| 19 | 25 | 30 | 29 | 26 | 10 | 4 | 2 |
| 11 | 12 | 16 | 22 | 18 | 9  | 3 | 1 |

Again, Table 4 shows the rank order of a 40-element and 76° rotation screen.

Figure 3:
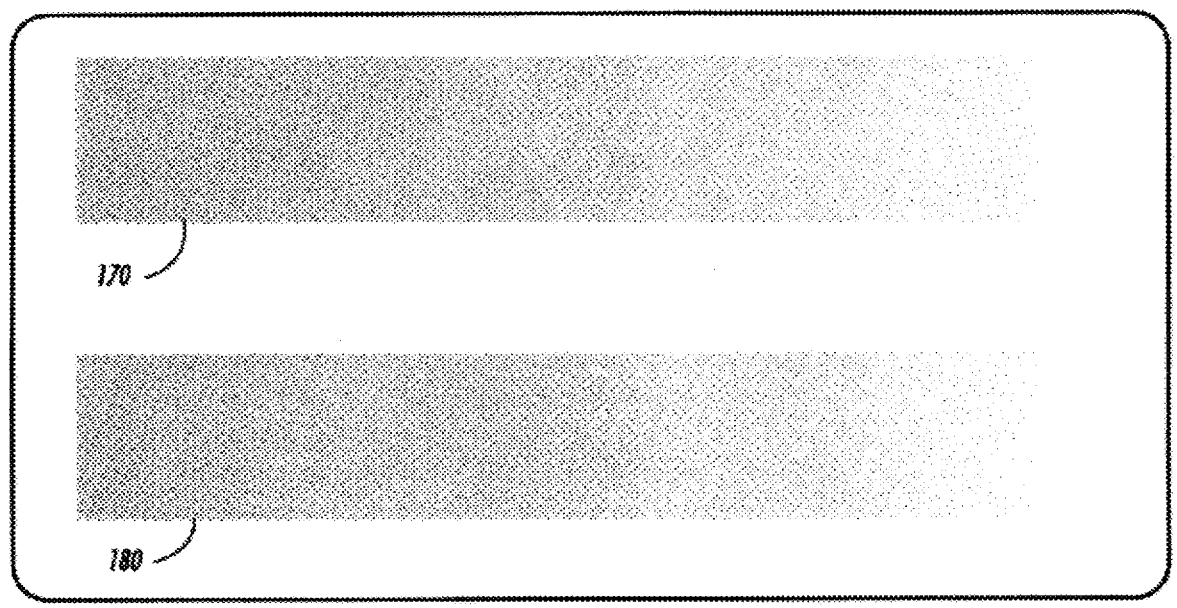
FIG. 3 is a set of exemplary image sweeps rendered according to other embodiments of the present invention.

FIG. 3 shows two halftone image generated using the 40 elements of Table 4. Sweep 170 is generated using the 40 elements alone. (Note the distinctive, undesirable steps formed as the sweep transitions to the highlight region.) In contrast, sweep 180 shows a halftone image generated using an optimized composite 120×120 screen with 360 base cluster cells. (Note the relatively smooth transition to the highlight region and the absence of steps or contours.)

While the present invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method of constructing a composite screen for halftoning a digitized image, comprising:

selecting a cluster screen halftoning system having a cell size of m cluster pixels;

selecting a stochastic screen halftoning system size having a set of n stochastic pixels; and merging the set of n pixels and m pixels into a composite stochastic screen of halftone cluster LUT having a set of threshold elements.

2. The method of claim 1, wherein m is an integer greater than 18.

3. The method of claim 1, wherein m is greater than or equal to 40.

4. The method of claim 1, wherein n is an integer greater than or equal to 360.

5. The method of claim 1, wherein a rank order for turning on the elements in at least a first half of the LUT is determined according to the steps of:

a) selecting a random pair of elements from all threshold elements within the first half of the LUT;

b) swapping the threshold of the two selected random elements;

c) calculating a centroid penalty and a momentum penalty associated with the swapped thresholds;

d) calculating a centroid penalty and a momentum penalty associated with the thresholds before the thresholds were swapped;

e) retaining the swapped thresholds in the first half of the LUT only when a first sum of the step d calculated penalties is less than a second sum of the step e calculated penalties; and f) repeating steps a through e for a predetermined set of i iterations.

6. The method of claim 5, wherein the second half of the LUT is obtained by taking the inverse of the values of the first half of the LUT.

7. The method of claim 1, wherein the LUT is used to halftone at least one color separation of a multicolored digitized image.

8. The method of claim 7, wherein the at least one color separation is yellow.

9. The method of claim 1, wherein the LUT is selectively used to halftone at least one of a plurality of selected image types.

10. The method of claim 9, wherein the at least one selected image type is a graphic image.

* * * * *